(12) United States Patent
Ramírez de Arellano

(10) Patent No.: US 7,185,472 B1
(45) Date of Patent: Mar. 6, 2007

(54) CONCRETE-BASED MATERIAL, AND METHOD OF APPLYING THE SAME

(76) Inventor: Eduardo Ramírez de Arellano, Losas Nuevo Estilo, Inc. P.O. Box 6451, Mayagüez, PR (US) 00623

( * ) Notice: Subject to any disclaimer, the term of this patent is extended or adjusted under 35 U.S.C. 154(b) by 0 days.

(21) Appl. No.: 10/807,895

(22) Filed: Mar. 24, 2004

Related U.S. Application Data

(63) Continuation-in-part of application No. 09/730,526, filed on Dec. 5, 2000, now Pat. No. 6,746,717.

(51) Int. Cl.
*E04B 1/00* (2006.01)

(52) U.S. Cl. .............. 52/741.41; 52/749.13; 427/270; 427/271; 427/276; 427/403

(58) Field of Classification Search ............ 52/741.41, 52/749.13; 427/270–272, 275, 356, 403, 427/276
See application file for complete search history.

(56) References Cited

U.S. PATENT DOCUMENTS

| | | | | |
|---|---|---|---|---|
| 1,991,996 A * | 2/1935 | Lodewijk | .................... | 427/270 |
| 2,871,774 A * | 2/1959 | Johnson | ........................ | 264/31 |
| 3,853,577 A * | 12/1974 | Nishida et al. | .............. | 427/270 |
| 3,955,992 A * | 5/1976 | Roberts | ....................... | 106/724 |
| 4,105,816 A * | 8/1978 | Hori | ............................ | 428/159 |
| 4,229,225 A * | 10/1980 | Kraszewski et al. | ........ | 106/643 |
| 4,293,599 A * | 10/1981 | Hori et al. | ................... | 427/274 |
| 4,349,588 A * | 9/1982 | Schiffer | ....................... | 427/230 |
| 4,746,552 A * | 5/1988 | Tokumoto et al. | ........ | 427/393.6 |
| 5,069,939 A * | 12/1991 | McKinnon | ................... | 427/262 |
| 5,203,629 A * | 4/1993 | Valle et al. | ..................... | 366/2 |
| 6,046,269 A * | 4/2000 | Nass et al. | ................... | 524/523 |
| 6,746,717 B2 * | 6/2004 | Ramirez de Arellano | ... | 427/270 |
| 6,833,188 B2 * | 12/2004 | Semmens | ................... | 428/361 |
| 6,880,198 B1 * | 4/2005 | Hazard | ....................... | 15/235.7 |

* cited by examiner

*Primary Examiner*—Jeanette E. Chapman
*Assistant Examiner*—Yvonne M. Horton
(74) *Attorney, Agent, or Firm*—Hoglund & Pamias, PSC; Heath W. Hoglund

(57) ABSTRACT

A concrete-based mortar is prepared for application on the exterior of a concrete building or other structure. The drying time of the concrete-based mortar is reduced by addition of an accelerant compound. After the concrete-based mortar sets on the building or other structure, an exterior portion of the concrete-based mortar is removed. This provides an even and attractive surface.

21 Claims, 4 Drawing Sheets

THE LEVEL
CREATED
BY THE
ROUGH
TROWEL

FRONT VIEW

Sliced view of an enlarged one-coat mortar

Leveled Surface

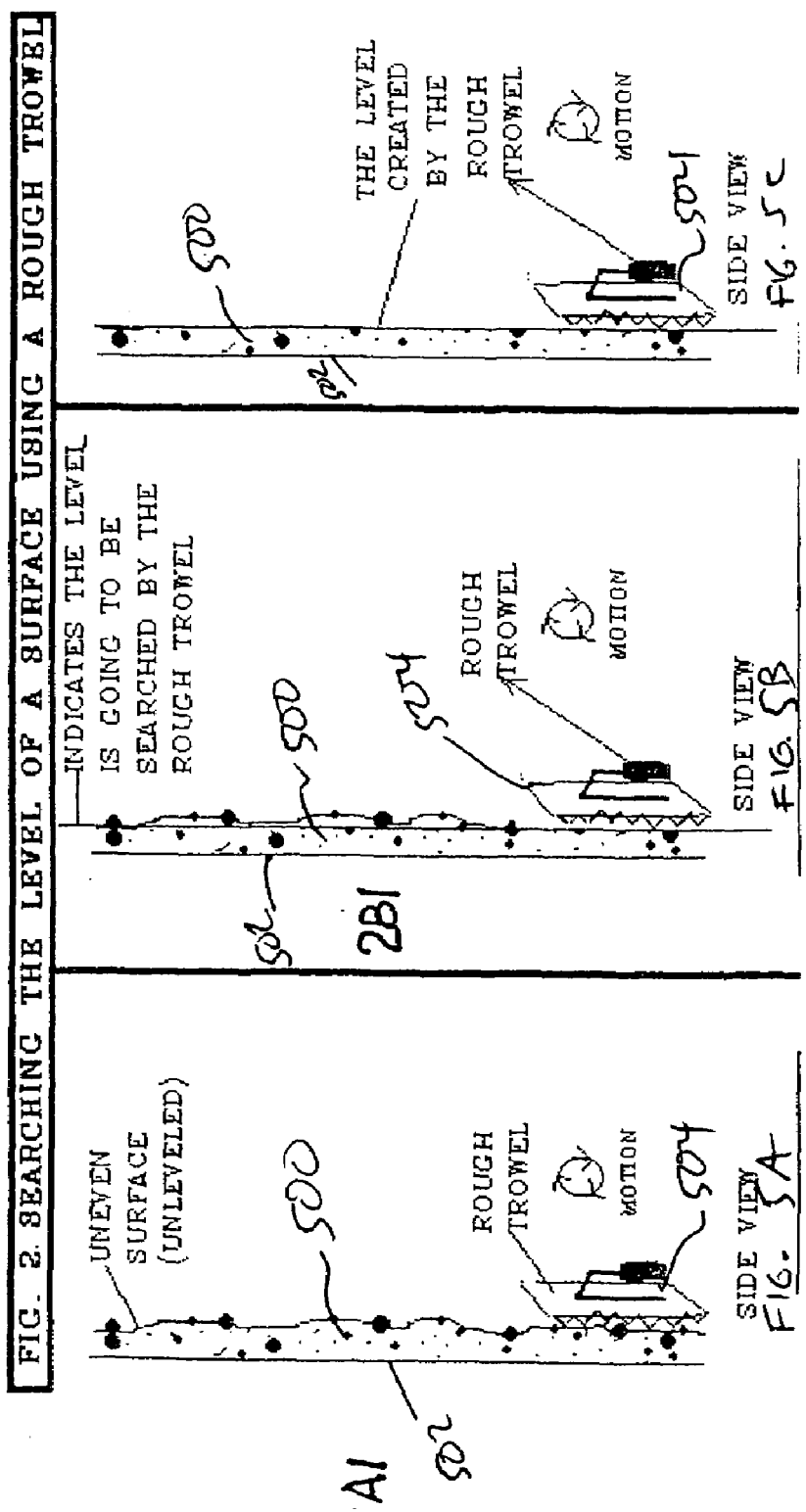

Sliced view of an enlarged one-coat mortar
Leveled Surface

Sliced view of an enlarged one-coat mortar
Searched Level

Sliced view of an enlarged one-coat mortar
Unleveled Surface

CONCRETE-BASED MATERIAL, AND METHOD OF APPLYING THE SAME

PRIORITY

This application is a continuation-in-part of application Ser. No. 09/730,526, filed Dec. 5, 2000 now U.S. Pat. No. 6,746,717.

FIELD OF THE INVENTION

The invention relates to an improved composition of a concrete-based material used to cover the interior or exterior of a building or other structure and a method of applying the composition. More specifically, the improved composition optimizes surface properties of a one-coat mortar and improves labor efficiency in the application process.

BACKGROUND

Concrete-based materials are used in a variety of applications. For example, concrete-based materials are often used to cover walls or other structures. U.S. Pat. No. 6,046,269, issued Apr. 4, 2000, by Nass et al., teaches a concrete-based compound that is used to create a Fresco-like finish on a wall or other structure. The drying time of certain mixtures taught by this patent can be reduced by the use of propylene glycol and methyl carbitol. In effect, these compounds act as accelerants that speed the drying process.

Other accelerates for concrete-based materials are commercially available. For example, BETTOR MBT, S.A., manufactures and sells an accelerant, which is commercially available as BETTACEL. BETTOR MBT may be contacted through their Internet web site, which is hosted at: www.bettor-mbt.es, or at either of the following physical addresses: Headquarters, BETTOR MBT, S.A., Joiers, s/n, 08184 Palau de Plegamans, (Barcelona), Spain; Telephone: 93 862 00 23; Facsimile: 93 862 00 19; or Production, BETTOR MBT, S.A., Duero, 23, Polígono Ind. Mejorada, 28840 Mejorada del Campo, (Madrid), Spain; Telephone: 91 668 21 56; Facsimile: 91 668 17 75.

The accelerant, BETTACEL, is an aqueous solution made with inorganic salts and halogens. Its main function is to accelerate drying time and hardening of mortar, increasing the mortar resistance in the process. The accelerant may be used even at low temperatures. This accelerant comes in a liquid state, and should be mixed first with part of the water to be used with the mortar, and then added to the mortar as the rest of the water is added. It comes in containers weighing 30 kg or 250 kg. The characteristics of this accelerant are as follows:

| Color: | Cloudy, non-color |
|---|---|
| pH: | 9 ± 1 |
| Density: | 1.3 ± 0.02 g/cm$^3$ |
| Chloride ions amount: | 25.5 ± 1.5% |

The recommended dosage is 2 to 5% of the weight of the mortar being used. This percentage varies according to the desired effect (how fast you want the mortar to dry), the temperature and the type of cement with which the accelerant will be applied.

Again, concrete-based materials are widely used on buildings or other structures to provide an even exterior surface. The concrete-based materials are spread over a rough concrete surface. Such rough concrete surfaces include bricks, blocks or stones that are held together by a cement.

Concrete-based materials for providing an even exterior surface are widely known, and commonly used in the construction arts. For example, U.S. Pat. No. 4,222,785, issued Sep. 16, 1980, by Henderson, teaches a concrete-based material suitable for application to the exterior of a building. This particular mixture provides certain insulating characteristics.

U.S. Pat. No. 4,229,225, issued Oct. 21, 1980, by Kraszewski et al., teaches another concrete-based material suitable for application to the exterior of a building. This particular mixture includes:

20–60% cement;
30–70% inorganic or organic filler;
2–10% zirconium, hafnium, vanadium or cesium silicate fibers;
0.2–1% plasticizers for cement;
1–3% adhesive; and
0.1–0.5% water-repellent.

This above mixture provides certain water-repellent characteristics discussed therein.

U.S. Pat. No. 4,946,505, issued Aug. 7, 1990, by Jungk, teaches yet another concrete-based material. More specifically, it teaches certain methods of dying concrete-based materials. The dyed materials may be applied to the exterior of a building or other structure.

Each of the above-identified patents are expressly incorporated herein by reference.

Similar one-coat concrete-based materials are also widely available in commercial markets. For example, Lafarge Texsa Morteros and Sermarksa sell many generic one-coat grey or white concrete-based products. Lafarge Texsa Morteros can be contacted at the following physical address: Lafarge Texsa Morteros, Pol. Can Peligri, C/Ferro, 7-08755, Catellbisbal(Barcelona), Spain; Tel. 936351290. Sermarksa can be contacted at the following physical address: Sermarksa, Carr. 152 Km9, 08110 Monocada, Rey Sak, Barcelona, Spain; Tel. 935726500.

PROPAMSA, S.A., is another company that manufactures and sells a number of concrete-based (or mortar-based) products that may be used to create an even interior or exterior surface on a building or other structure. These include PROPAM REVOC and REVAT RASPADO. PROPAMSA may be contacted at the following physical address: PROPAMSA, S.A., Ctra. N-340 Km 1242.3, Pol. Ind. Les Fallulles, San Vincent Del Horts, 08620 Barcelona, Spain. The application and characteristics of these products are discussed below.

The PROPAM REVOC and REVAT RASPADO products can be used by following a simple three-step process. First, the products are mixed with water to the desired consistency. Second, the products are applied to a rough concrete surface using a smooth trowel 100 (shown in FIG. 1). Third, when the product becomes semi-dry, the exterior skin is removed using a rough trowel 200 (shown in FIG. 2). This creates an even exterior finish that is both attractive and resistant to weather. FIG. 3 shows the application of these concrete-based materials 310 to a block wall 320.

PROPAM REVOC is a mortar based on cement, additives and aggregates that give it the property of high impermeability. It must be applied to a base that is resistant, completely hardened and extremely clean (free of dust, paint, oil, etc.). Also, if the base is exposed to sun or is made of a highly absorbent material, then the surface must first be dampened before applying PROPAM REVOC.

PROPAM REVOC is sold in 25 kg bags that are mixed manually or mechanically with 17% water (about 4.5 L). Once it is mixed it must be applied within 25 minutes or it will begin to harden. This mixture comes in gray and white and will cover approximately 2 kg/m² per cm of thickness. This, however, depends upon both the flatness and the roughness of the surface. For example, rough brick surfaces will require more, relatively smooth and even concrete walls will require less.

The characteristics of this particular product are as follows:

| | |
|---|---|
| Apparent density of the powder: | 1.6 g/cm³ |
| Mixing water: | 17 % |
| Apparent density of the paste: | 2.0 g/cm³ |
| Mixtures lifetime: | 90 minutes |
| Density of hardened product: | 1.7 g/cm³ |
| Flexotraction strength: | 20 kg/cm² |
| Compressive resistance: | 60 kg/cm² |
| Coefficient of capillarity: | 0.6 g/dm² min$^{1/2}$ |
| Modulus of elasticity: | 85.000 kg/cm² |

REVAT RASPADO is a one-coat mortar also based on cement, additives and aggregates that give protection as well as a decorative finish to a building. This product is impermeable to rain water and permeable to water vapor to prevent condensation.

REVAT RASPADO is prepared by mixing the 30 kg bag with 20% water (6 L) until a smooth paste is formed. Once the mixture is made, it must stand for 5 minutes so the mixture will settle. Then the mixture is spread with a trowel. If it is applied to a highly absorbent surface, a first coat should be applied as a primer. The additives include dyes, and the product is available in a variety of colors. It will cover approximately 20 kg/m² per cm of thickness. The type of finish and lack of flatness of the surface will alter the coverage of this mortar. The characteristics of this particular product are as follows:

| | |
|---|---|
| Product in powder form: | |
| Apparent density: | 1.4 g/cm³ |
| Loss in 450° C. fire: | 1 % |
| Loss in 900° C. fire: | 35 % |
| Particles greater than 1.2 mm | 4.0 % (by weight) |
| Particles greater than 0.18 mm | 55.0 % (by weight) |
| Product in paste form: | |
| Mixing water: | 20 % |
| Apparent density: | 1.8 g/cm³ |
| Hardened product: | |
| Product density: | 1.6 g/cm³ |
| Flexural strength: | 35 kg/cm² |
| Compressive resistance: | 80 kg/cm² |
| Tensile strength: | 8.3 kg/cm² |
| Elasticity modulus: | 90,000 kg/cm² |
| Shrinkage: | 1.0 mm/m |
| Coefficient of capillarity: | 1 g/dm² min$^{1/2}$ |
| Permeability to vapor: | 0.5 g/m² h mmHg |

Under typical application conditions (approximately 80 degrees Fahrenheit and high humidity), the expected dry time of PROPAM REVOC or REVAT RASPADO can exceed 4 hours (as long as 6 hours has been observed). As will be appreciated from the foregoing, the application of these products is labor intensive. First, the application requires a significant expenditure of labor hours even for a relatively small area. Then, after the product has set, another significant expenditure of labor hours is required to remove the exterior skin with the rough trowel. Some methods of reducing the required labor hours have been developed. For example, the mortar can be sprayed upon the surface of a building rather than applied manually. This somewhat reduces labor hours, but still requires a significant effort to smooth and remove the exterior skin. The labor-intensive nature of these products is not unique. Other concrete-based materials used to treat the interior and exterior of a building also require a significant expenditure of labor hours.

In addition to labor hours, another important feature of a one-coat mortar is its finish. When the product is finished it must present a smooth attractive surface. Preferably, the surface is flat and even, however, a perfectly flat and even surface lacks a certain desirable aesthetic. Indeed, the cold, hard look of a concrete surface has limited the acceptance of one-coat mortar finishes. Thus, developing a more attractive aesthetic remains an important object of one-coat mortar finishes.

SUMMARY

According to one aspect of the invention, an even interior or exterior surface is formed on a building. The method is especially suited for reducing the labor requirements of applying a concrete-based material to the building. An exterior portion of the mortar surface is removed by scraping a rough trowel against the mortar surface.

According to further aspects of the invention, the concrete-based mortar has at least fifty-percent of particles greater than 0.18 millimeters in diameter (by weight) and at least two-percent of particles greater than 1.2 millimeters in diameter (by weight).

According to a further aspect of the invention, the concrete-based mortar includes particles, such as sand, having a diameter of greater than 0.18 millimeters as at least half (by weight) of the composition of the concrete-based mortar. At least a percent of those particles (by weight) have a diameter greater than 1.2 millimeters.

According to another aspect of the invention, a concrete-based mortar, including sand, is mixed with water to form a resulting composition that hardens. The sand includes grains approximately 1 millimeter in diameter and grains less than 0.5 millimeters in diameter. The resulting composition is applied to an exterior of a building. The resulting composition hardens on the building for a time sufficient to prevent reformation of the composition. The resulting composition is scraped to remove an exterior portion of the resulting composition. The surface of the composition defines a plane after the step of scraping. At least a portion of the grains approximately 1 millimeter in diameter lie along the plane and are removed by the step of scraping so that the surface includes a plurality of divots where the grains approximately 1 millimeter in diameter have been removed.

According to another aspect of the invention, the resulting composition is applied by spreading the resulting composition on the exterior of the building with a trowel.

According to another aspect of the invention, the resulting composition is applied by spraying or projecting the resulting composition on the exterior of the building by projection.

DESCRIPTION OF THE DRAWINGS

FIG. 5A is a side view of an exterior wall showing the application of a concrete-based mortar.

FIG. 5B is a side view of the exterior wall of FIG. 5A showing the process of scraping the exterior wall with a rough trowel.

FIG. 5C is a side view of the exterior wall of FIG. 5B showing the exterior wall after completely scraping the exterior wall with the rough trowel.

DETAILED DESCRIPTION

Figure 4:
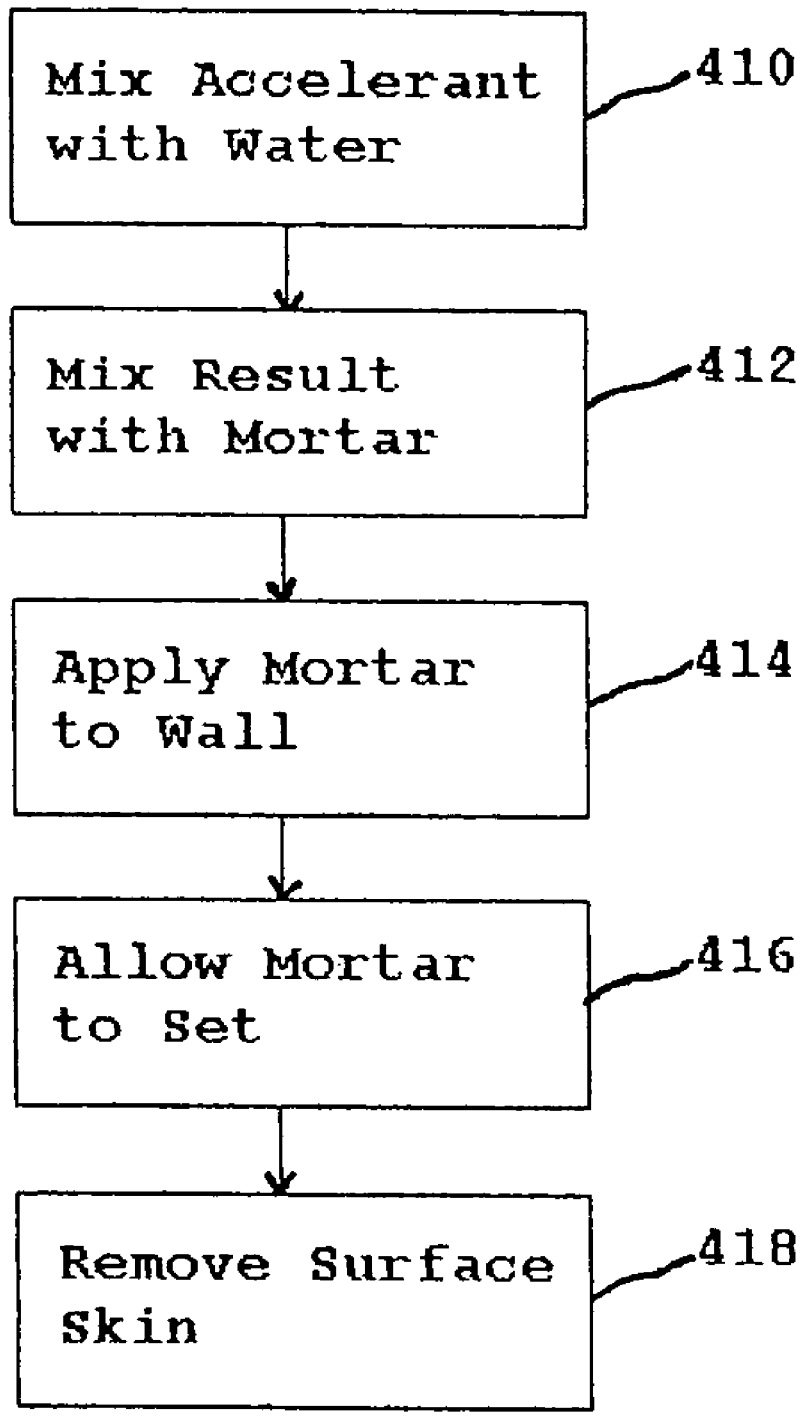
FIG. 4 is a flow chart showing one preferred method of applying a concrete-based mortar to the exterior of a building or other structure.

With reference to FIG. 4, one preferred method of implementing the invention will be described. The process begins at step 410 by mixing an accelerant with water. As used herein, an accelerant is any compound, mixture, substance, liquid, powder or process that reduces the drying time of a concrete-based material. Here the accelerant, BETTACEL, available from BETTOR MBT, S.A., is mixed with water. The properties of this particular product are set forth above.

Next, at step 412, the accelerant and water mixture is added to a concrete-based mortar. As used herein, concrete-based mortar is any compound having sand, aggregates and cement as components of the mortar. Here, one of the concrete-based mortars, PROPAM REVOC or REVAT RASPADO, available from PROPAMSA, S.A., is used. The properties of these particular products are set forth above.

As one alternative, the accelerant and any other additives are included with the concrete-based mortar. In a single step, this mortar is then mixed with water. This method is particularly well suited for applications where the mortar is pre-mixed.

Figure 1:
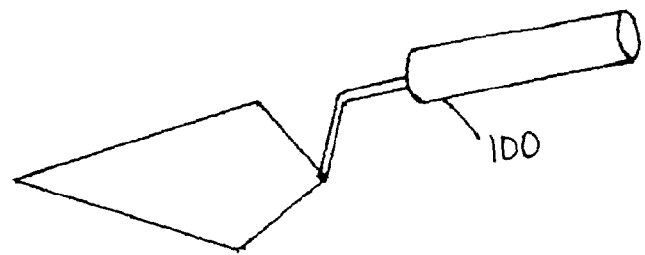
FIG. 1 is a perspective view of a smooth trowel (prior art).

Next, at step 414, the resulting mixture is applied to the exterior or interior of a building or other structure. As those skilled it the art will appreciate, the surface should be clean and free of any oils, dust, dirt, debris, etc., to aid the formation of a strong bond between the mixture and the building or other structure. The mixture is applied with a smooth trowel 100 (shown in FIG. 1) in a layer that is approximately 1 cm thick. When applied to rough surfaces the thickness may vary somewhat. Preferably, however, the mixture is applied to a relatively smooth surface such as a flat block wall.

As an alternative method of application, the resulting mixture can be sprayed upon the building. In this preferred method, the concrete mortar is mixed so that it can pass through a hose and a spray nozzle. The mixture is made using various additives, which are described below. The mortar is then sprayed or protected upon the surface of a building in relatively continuous beads. After this application, the beads are smoothed with a flat trowel.

Figure 2:
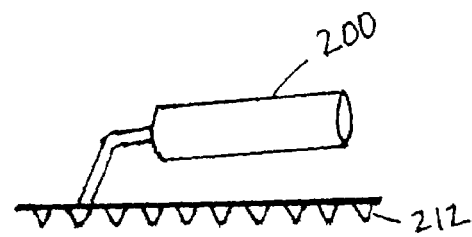
FIG. 2 is a perspective view of a rough trowel (prior art).
Figure 3:
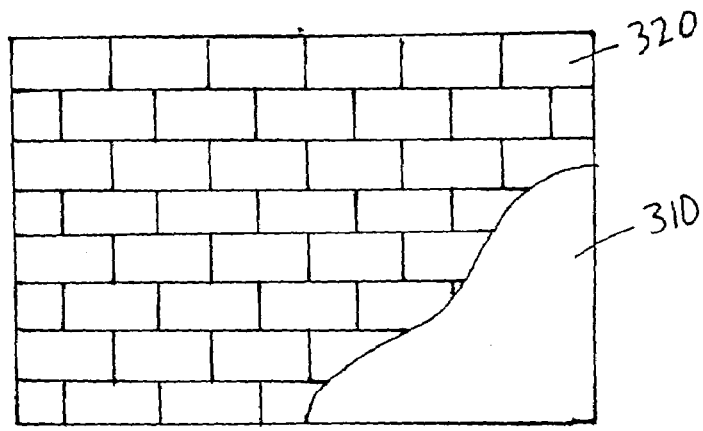
FIG. 3 is an elevation view of a concrete wall partially covered with mortar (prior art).

After application, at step 416, the mixture is allowed to set so that a skin begins to form on the exterior of the mixture. As the mixture is setting, the mason(s) may continue to apply the mixture on other parts of the building. As the mason finishes such other parts, the first application will have set and is ready to be scraped with the rough trowel 200 (shown in FIG. 2). Likewise, as the mason finishes scraping the first application, the subsequent application will have begun to set. Such areas may then be scraped with the rough trowel 200 as well.

At step 416, the applied mixture is tested to determine whether it has sufficiently set so that it is ready to be scraped with the rough trowel 200. The rough trowel 416 is briskly scraped against a small section of the mixture, in an inconspicuous area. If the mixture sticks to the spikes 212 of the rough trowel 416, then it is not dry yet and cannot be scraped. When the rough trowel 200 can pass across the applied mixture in a way that removes the exterior skin but does not stick to the spikes 212, then the applied mixture is dry and the area is completely scraped. This process effectively removes the excess cement mixture and creates a relatively smooth and even surface on the wall of a building since the rough trowel guides you to prevent uneven scraping of the wall.

Where the concrete-based mortar is sprayed upon the building, the mixture is left to set for a time sufficient so that it will not stick to the rough trowel when the surface is scraped. The rough trowel is used both to level and smooth the surface.

The following table sets forth the expected dry time for the listed mixtures of the concrete-based mortar, PROPAM REVOC, the accelerant, BETTACEL, and water, in conditions of shade, high-humidity, and approximately 70–80 degrees Fahrenheit:

| PROPAM REVOC (Kilograms) | WATER (grams) | Accelerant (grams) | Dry Time (hours:minutes) |
|---|---|---|---|
| 2.5 | 400 | 0 | 3:50 |
| 2.5 | 400 | 50 | 3:30 |
| 2.5 | 400 | 62.5 | 2:45 |
| 2.5 | 400 | 75 | 2:15 |
| 2.5 | 400 | 87.5 | 1:30 |
| 2.5 | 400 | 100 | 0:55 |

This other table sets forth the expected dry time for the listed mixtures of the concrete-based mortar, PROPAM REVOC, the accelerant, BETTACEL, and water, in conditions of sunlight, high-humidity, and approximately 70–80 degrees Fahrenheit:

| PROPAM REVOC (Kilograms) | WATER (liters) | Accelerant (cm$^3$) | Dry Time (hours:minutes) |
|---|---|---|---|
| 25 | 5 | 0 | 3:00 |
| 25 | 5 | 100 | 2:30 |
| 25 | 5 | 200 | 2:10 |
| 25 | 5 | 300 | 1:45 |
| 25 | 5 | 400 | 1:50 |
| 25 | 5 | 500 | 1:32 |

Generally, a reduction in dry time helps to improve the efficiency of the labor-intensive application process. In particular, the shortened dry time helps to minimize the down time of a mason between the application and scraping steps. Without the shortened dry time, a mason might have to wait as the applied material sets. As the mixture is applied, it dries relatively quickly and the mason can then scrape the applied material. The resulting surface provides an attractive, even finish.

The preferred mixture consists of 2.5 kg of the above cement-based mortar, 400 grams of water, and 75 grams of the above accelerant. This mixture sets in approximately 2 hours to 2 hours and 15 minutes. Although further reductions in the dry time are possible, they can begin to cause other application problems. For example, a further reduction in dry time can cause the applied material to set completely before the mason has an opportunity to scrape the surface. This can make the scraping process much more difficult, if not impossible, in obtaining an attractive, even surface. It can also begin to crack because the faster it dries the higher the temperature of the concrete mixture. This high temperature causes it to crack, thus rendering it useless.

Similar results can be obtained with other concrete-based mortars. For example, the concrete-based mortar REVAT RASPADO, the above accelerant, and water can also be mixed to obtain a similar dry time. Specifically, a mixture of 3 kg of this concrete-based mortar, 75 grams of the accelerant, and 600 grams of water provide the preferred characteristics.

Again, the reduced drying time of these concrete-based mortars make the application and scraping of the concrete-based mortar much faster. This reduces labor time and associated costs. Also, the resulting material is very easy to scrape. The mixture also makes it possible for the job of applying and scraping to be finished the same day it was started. This reduces any wasted materials as may occur with a longer dry time.

As set forth above, in an alternative preferred embodiment of the invention, the concrete-based mortar is sprayed on the surface of a building. The mixture for this concrete-based mortar will depend upon the desired properties of the finished surface. For a fine-finished surface, the preferred mixture is as follows:

| Material used | (Kg/ton of mortar) | (g./ton of mortar) |
|---|---|---|
| White cement PB-42.5 | 150 | |
| Sand | 663 | |
| Dust or Filler | 187 | |
| Rheomix 924 | | 150 |
| Rheomix 740 | | 1,300 |
| Rheomix 725 | | 500 |
| Water | 180 | |

Although the above table sets for the preferred composition, the specific amount may vary somewhat. For example, the White cement PB-42.5 may vary from 75–225 Kg/ton of mortar. The sand may vary from 331.5–994.5 Kg/ton of mortar and the dust or filler may vary from 93.5–280 Kg/ton of mortar.

For a medium-finished surface, the preferred mixture is as follows:

| Material used | (Kg/ton of mortar) | (g./ton of mortar) |
|---|---|---|
| White cement PB-42.5 | 150 | |
| Sand | 621 | |
| Dust or Filler | 229 | |
| Rheomix 924 | | 150 |
| Rheomix 740 | | 1,300 |
| Rheomix 725 | | 500 |
| Water | 180 | |

Although the above table sets for the preferred composition, the specific amount may vary somewhat. For example, the White cement PB-42.5 may vary from 75–225 Kg/ton of mortar. The sand may vary from 310–931 Kg/ton of mortar and the dust or filler may vary from 93.5–280 Kg/ton of mortar.

For a coarse-finished surface, the preferred mixture is as follows:

| Material used | (Kg/ton of mortar) | (g./ton of mortar) |
|---|---|---|
| White cement PB-42.5 | 150 | |
| Sand | 637 | |
| Dust or Filler | 170 | |
| Aggregate | 43 | |
| Rheomix 924 | | 150 |
| Rheomix 740 | | 1,300 |
| Rheomix 725 | | 500 |
| Water | 180 | |

Although the above table sets for the preferred composition, the specific amount may vary somewhat. For example, the White cement PB-42.5 may vary from 75–225 Kg/ton of mortar. The sand may vary from 318–955 Kg/ton of mortar; the dust or filler may vary from 85–255 Kg/ton of mortar; and the aggregate may vary from 21–64.5 Kg/ton of mortar.

In the above tables, Reomix 924 is an aerating-plasticizing additive. Its main function is to aerate and its secondary function is water reduction and to increase adherence. Reomix 740 is a hydrofuge agent. It acts as a hydrofuge impermeable to rain and improves adherence by cellulose. Finally, Reomix 725 is an aerating-plasticizing additive. It acts as a water retainer and improves adherence by cellulose. These compounds, namely Reomix 924, Reomix 740 and Reomix 725, are commercially available from BETTOR, MBT, whose contact information was supplied above. Alternatively, other hydrofuge additives and aerating-plasticizing additives may be used. These are commercially available from a variety of sources.

Various additives are used to obtain the desired properties for projecting, drying and scraping. These include water retainers, plastifiers, hydrofuges, accelerants, retardants and resins.

Water retainers include cellulose ethers, entonytes and septiolytes. The cellulose ethers are used in projection mortars mainly in the form of methylcellulose (MC), methylhydroethylcellulose (MHEC) and methylhydroxipropylcellulose (MHPC) or mixed cellulose ethers. Small amounts already delay the quick penetration of the water in the absorbent base facilitating a homogeneous forge and hardening. Premature drying is prevented on the plasters and mortars, thereby guaranteeing the prolonged working time necessary for a rational construction. The power of water retention in types MC, MHEC and MHPC is determined by the grade of viscosity, size of the grain, time of dissolution, and temperature. The dissolution time depends on the size and the metric distribution of the grain and of the chemical modification. Bentonytes are used as load and they have retention power. Septiolytes are also used as retainers and at the same time as a tyxotropic product for the mortar.

The plastifiers are based on lignosulphates, melamines, naphtalenes and carboxilates.

The Hydrofuges are based on materials that use as a base sodium oleates, cadmium stereates, zinc, siliconates or others.

The accelerants include calcic formiate.

The retardants include salts derived from citric acid.

The resins include vinyl acetate in rediffusable powders.

Turning to FIGS. 5A, 5B and 5C, the process of finishing a wall with spray-on one-coat mortar is further described. As shown in FIG. 5A, after spraying the one-coat mortar 500 on a wall 502 and smoothing with a flat trowel, the surface is still somewhat uneven. The rough trowel 504 is touched against the surface to determine whether it has hardened sufficient to prevent sticking. When this is the case, the rough trowel is scraped in a circular motion about the surface.

As shown in FIG. 5B, this flattens the surface. Here, the lower portion of the one-coat mortar 500 has been scraped and the surface is relatively flat. The upper portion of the one-coat mortar has not been scraped and it is still uneven. As shown in FIG. 5C, the entire surface of the one-coat mortar is scraped so that it is flat and even. This provides a finished appearance.

Figure 6C:
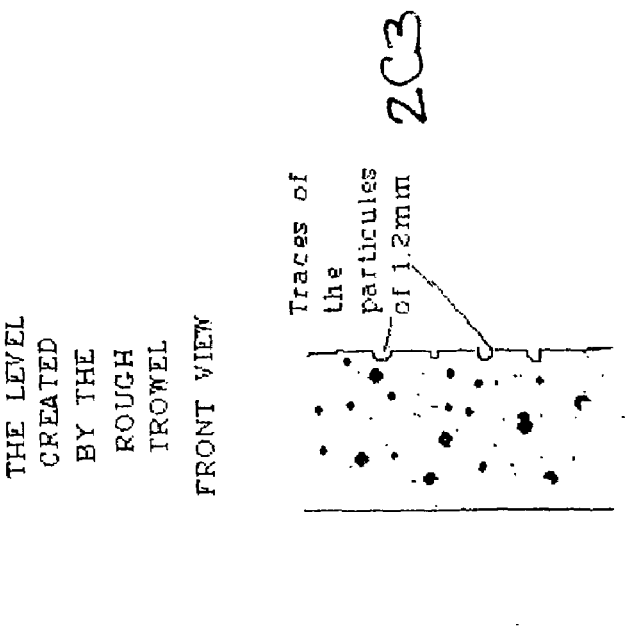
FIG. 6C is a schematic, close-up side view of a portion of the exterior wall of FIG. 5C.
Figure 6B:
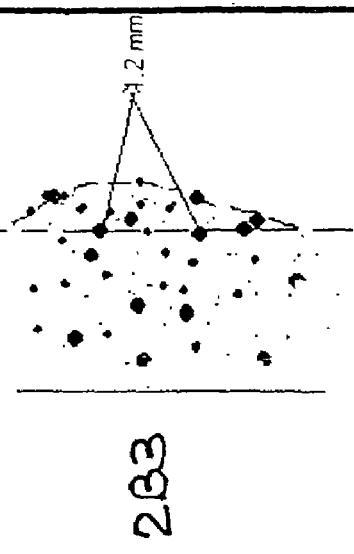
FIG. 6B is a schematic, close-up side view of a portion of the exterior wall of FIG. 5B.
Figure 6A:
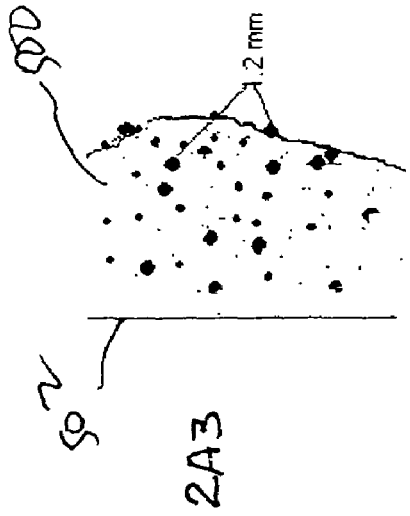
FIG. 6A is a schematic, close-up side view of a portion of the exterior wall of FIG. 5A.

Turning to FIGS. 6A, 6B and 6C, this process is further described on a macroscopic level. FIG. 6A shows the one-coat mortar 500 after being sprayed and smoothed on a wall but before being scraped. It includes sand particles of the size used and in the percentages used to make the one-coat mortar. Preferably, the one-coat mortar includes a fraction of relatively large particles, approximately 1 mm in diameter. These are shown as the largest dots in FIG. 6A.

FIG. 6B shows the plane 600 along which the surface is leveled. The rough trowel 504 scrapes the surface so that it becomes even along this plane 600. A number of the large particles will lie in this plane 600.

FIG. 6C shows the finished surface, which is flat and even. The large particles along the plane 600 have been removed. This leaves small traces, or divots, where the large particles had been. These divots give the surface a pleasant appearance.

Preferred mixtures of sand are used to create these surfaces. For a fine-finished surface, the composition of one preferred mixture is specified by the following table:

TABLE

| Fine #1 | |
| --- | --- |
| Diameter (mm) | Weight percent |
| 1.0 | 5.4 |
| 0.5 | 21.1 |
| 0.25 | 16.0 |
| 0.125 | 15.1 |
| 0.063 | 14.2 |
| <0.063 | 28.2 |

The tolerance with respect to the diameter of particle extends up to the next larger sized particle. Thus, particles as large as 0.99 mm in diameter are considered to be approximately 0.5 mm. Likewise, particles as small as large as 0.49 mm in diameter are considered to be approximately 0.25 mm. The size of the larges particle, 1.0 mm, extends up to approximately 1.5 mm. For each of the diameter sizes, the weight percentages preferably are within ±1% of the total weight or ±10% of the stated value, whichever is greater. These tolerances also apply to each of the following tables.

For a medium-finished surface, the composition of two preferred mixtures are specified by the following tables:

TABLE

| Medium #1 | |
| --- | --- |
| Diameter (mm) | Weight percent |
| 1.0 | 15.1 |
| 0.5 | 11.7 |
| 0.25 | 10.8 |
| 0.125 | 25.2 |
| 0.063 | 13.6 |
| <0.063 | 23.6 |

TABLE

| Medium #2 | |
| --- | --- |
| Diameter (mm) | Weight percent |
| 1.0 | 15.1 |
| 0.5 | 11.7 |
| 0.25 | 10.8 |
| 0.125 | 25.2 |
| 0.063 | 13.6 |
| <0.063 | 23.6 |

For a coarse-finished surface, the composition of one preferred mixture is specified by the following table:

TABLE

| Coarse #1 | |
| --- | --- |
| Diameter (mm) | Weight percent |
| 2.0 | 0.1 |
| 1.6 | 5.7 |
| 1.0 | 17.5 |
| 0.5 | 17.3 |
| 0.25 | 9.8 |
| 0.125 | 8.7 |
| 0.063 | 3.4 |
| <0.063 | 36 |

Finally, for an extra-coarse-finished surface, the composition of two preferred mixtures are specified by the following tables:

TABLE

| Extra Coarse #1 | |
| --- | --- |
| Diameter (mm) | Weight percent |
| 4.0 | 0.2 |
| 2.0 | 13.2 |
| 1.6 | 4.4 |
| 1.0 | 12.2 |
| 0.5 | 13.6 |
| 0.25 | 9.8 |
| 0.125 | 8.7 |
| 0.063 | 3.4 |
| <0.063 | 34.5 |

TABLE

Extra Coarse #2

| Diameter (mm) | Weight percent |
|---|---|
| 4.0 | 0.1 |
| 2.0 | 10.1 |
| 1.6 | 4.6 |
| 1.0 | 5.7 |
| 0.5 | 23.2 |
| 0.25 | 9.8 |
| 0.125 | 8.7 |
| 0.063 | 3.4 |
| <0.063 | 34.5 |

The above mixtures of sand can be summarized by the following table, which sets forth the preferred ranges for all diameters and textures (i.e., fine, medium, coarse, etc.):

TABLE

All Textures

| Diameter (mm) | Weight percent |
|---|---|
| 4.0 | 0–5 |
| 2.0 | 0–15 |
| 1.0 | 5–20 |
| 0.5 | 10–35 |
| 0.25 | 10–20 |
| 0.125 | 5–30 |
| 0.063 | 2–15 |
| <0.063 | 20–40 |

The above mixtures produce optimal results when using the methods shown and described with reference to FIGS. 5A, 5B, 5C, 6A, 6B and 6C. The compositions provide a smooth and even surface and, at the same time, produce a pleasant appearance by the selective removal of the larger particles. The remaining divots provide a unique surface character.

Although the invention has been described with reference to preferred embodiments, those skilled in the art will appreciate that many modifications are possible without departing from the scope of the invention. More specifically, although the invention has been described with reference to specific concrete-based mortars, accelerants and application steps, other compounds and steps may also be used. For example, the concrete-based mortar may be mixed with a solid accelerant in powder form in a composition that achieves the above-described benefits. Likewise, the mentioned compounds and mixtures are available from a wide variety of sources and the claims are not in any way limited to the specific commercial mixtures mentioned and described above. Many other modifications are also possible. The following claims are intended to cover all such modifications and variations of the invention.

I claim:

1. A method of applying a concrete-based mortar to a building comprising the steps of:
    mixing a concrete-based mortar, including sand, and water to form a resulting composition that hardens, wherein the sand includes grains approximately 1 millimeter in diameter and grains less than 0.5 millimeters in diameter;
    applying the resulting composition to an exterior of a building to form an uneven surface;
    allowing the resulting composition to harden on the building for a time sufficient to prevent reformation of the composition; and
    scraping a rough trowel against the resulting composition by moving the rough trowel in a circular motion to remove an exterior portion of the resulting composition after the step of allowing the resulting composition to harden on the building for a time sufficient to prevent reformation of the composition and further to remove portions of the uneven surface that lie above the plane so that the surface becomes even without further application of the resulting composition, wherein the surface of the composition defines a plane after the step of scraping, and wherein at least a portion of the grains approximately 1 millimeter in diameter lie along the plate and are removed by the step of scraping so that the surface includes a plurality of divots where the grains approximately 1 millimeter in diameter have been removed.

2. The method of claim 1, wherein in the step of mixing the concrete-based mortar, the sand includes approximately 5% by weight of particles having a diameter of approximately 1 mm or greater and approximately 95% by weight of particles having a diameter of approximately 0.5 mm or less.

3. The method of claim 2, wherein in the step of mixing the concrete-based mortar, the sand includes the following mixture:

| Diameter (mm) | Weight % |
|---|---|
| 1.0 | 5.4 |
| 0.5 | 21.1 |
| 0.25 | 16.0 |
| 0.125 | 15.1 |
| 0.063 | 14.2 |
| <0.063 | 28.2. |

4. The method of claim 1, wherein in the step of mixing the concrete-based mortar, the sand includes the following mixture:

| Diameter (mm) | Weight % |
|---|---|
| 1.0 | 15.1 |
| 0.5 | 11.7 |
| 0.25 | 10.8 |
| 0.125 | 25.2 |
| 0.063 | 13.6 |
| <0.063 | 23.6. |

5. The method of claim 1, wherein in the step of mixing the concrete-based mortar, the sand includes the following mixture:

| Diameter (mm) | Weight % |
|---|---|
| 2.0 | 0.1 |
| 1.6 | 5.7 |
| 1.0 | 17.5 |
| 0.5 | 17.3 |
| 0.25 | 9.8 |
| 0.125 | 8.7 |
| 0.063 | 3.4 |
| <0.063 | 36. |

6. The method of claim 1, wherein the step of applying the resulting composition to an exterior of a building comprises spreading the resulting composition on the exterior of the building with a trowel.

7. The method of claim 1, wherein the step of applying the resulting composition to an exterior of a building comprises spraying the resulting composition on the exterior of the building by projection.

8. A method of applying a concrete-based mortar to a building comprising the steps of:

mixing a concrete-based mortar, including sand, to form a resulting composition that hardens upon application to a surface, wherein the sand includes coarse particles approximately 1 mm in diameter, or greater, and includes fine particles approximately 0.5 mm in diameter, or less;

applying the resulting composition to a surface to form a layer of non-uniform thickness of the resulting composition on the surface;

scraping the resulting composition with a rough trowel by moving the rough trowel in a circular motion to form an even surface along a plane, wherein a portion of the coarse particles lie in the plane and wherein at least a portion of the coarse particles that lie in the plane are removed by the scraping to leave divots of matching size in the even surface; and allowing the resulting composition to harden, after the step of applying the resulting composition and before the step of scraping the resulting composition, for a time sufficient: (a) to prevent reformation of the resulting composition; (b) to prevent uneven scraping of the resulting composition by the rough trowel; and (c) to prevent any of the resulting composition from sticking to the rough trowel.

9. The method of claim 8, wherein in the step of mixing the concrete-based mortar the sand has the following composition:

| Diameter (mm) | Weight % |
|---|---|
| 4.0 | 0–5 |
| 2.0 | 0–15 |
| 1.0 | 5–20 |
| 0.5 | 10–35 |
| 0.25 | 10–20 |
| 0.125 | 5–30 |
| 0.063 | 2–15 |
| <0.063 | 20–40. |

10. The method of claim 8, wherein the step of applying the resulting composition to the surface comprises applying the resulting composition with a trowel.

11. The method of claim 8, wherein the step of applying the resulting composition to the surface comprises applying the resulting composition by projection then smoothing with a trowel.

12. The method of claim 8, wherein in the step of mixing the concrete-based mortar, the concrete-based mortar further includes an accelerant.

13. The method of claim 8, wherein in the step of mixing the concrete-based mortar, the concrete-based mortar further includes a plastifier.

14. A method of applying a concrete-based mortar to a building comprising the steps of:

mixing a concrete-based mortar, including sand, to form a resulting composition that hardens upon application to a surface, wherein the sand includes coarse particles approximately 1 mm in diameter, or greater, and includes fine particles approximately 0.5 mm in diameter, or less;

applying the resulting composition to a surface;

scraping the resulting composition with a rough trowel to form an even surface along a plane, wherein a portion of the coarse particles lie in the plane and wherein at least a portion of the coarse particles that lie in the plane are removed by the scraping to leave divots of matching size in the even surface, and wherein the step of scraping the resulting composition further comprises removing peak areas of the layer of non-uniform thickness until the layer has a uniform thickness; and allowing the resulting composition to harden, after the step of applying the resulting composition and before the step of scraping the resulting composition, for a time sufficient: (a) to prevent reformation of the resulting composition; (b) to prevent uneven scraping of the resulting composition by the rough trowel; and (c) to prevent any of the resulting composition from sticking to the rough trowel.

15. A method of applying a concrete-based mortar to a building comprising the steps of:

mixing a concrete-based mortar, to form a resulting composition that hardens upon application to a surface, wherein the concrete-based mortar includes coarse particles;

applying the resulting composition to a surface in a layer having non-uniform thickness;

allowing the resulting composition to harden for a time sufficient to prevent reformation of the resulting composition; and scraping the resulting composition with a rough trowel having a plurality of teeth extending from the rough trowel, wherein the step of scraping removes at least a portion of the resulting composition that has hardened so that the layer has uniform thickness, and wherein the method excludes an additional step of applying another layer of the resulting composition.

16. The method of claim 15, wherein the step of scraping the resulting composition further comprises removing the coarse particles from an exterior surface of the layer having uniform thickness to leave divots in the exterior surface having dimensions approximately equal to the coarse particles.

17. The method of claim 16, wherein the coarse particles have a diameter of at least approximately 1 mm.

18. The method of claim 16, wherein the coarse particles have a diameter of at least approximately 2 mm.

19. The method of claim 16, wherein the coarse particles have a diameter of at least approximately 4 mm.

20. The method of claim 15, wherein the step of allowing the resulting composition to harden occurs before the step of scraping the resulting composition with the rough trowel.

21. The method of claim 15, wherein:

the coarse particles have a diameter of at least approximately 1 mm;

the step of scraping the resulting composition further comprises removing the coarse particles from an exterior surface of the layer having uniform thickness to leave divots in the exterior surface having dimensions approximately equal to the coarse particles;

the step of allowing the resulting composition to harden occurs before the step of scraping the resulting composition with the rough trowel; and the method excludes an additional step of applying another layer of the resulting composition.

* * * * *